Nov. 1, 1949.   M. HATTAN   2,486,403
PRESSURE INFLATED PARACHUTE LOAD ARRESTING DEVICE
Filed April 3, 1947   2 Sheets-Sheet 1
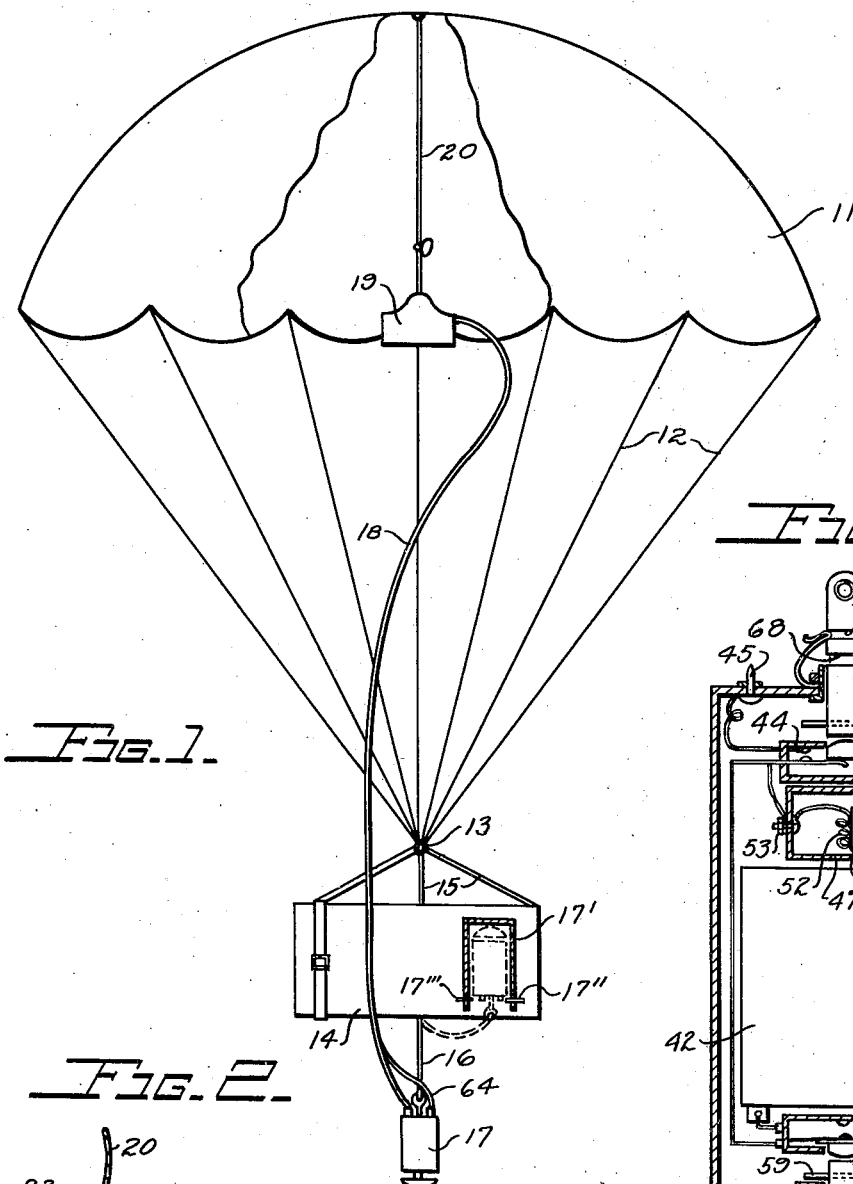
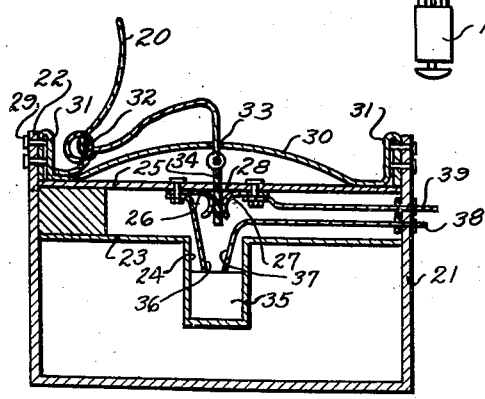
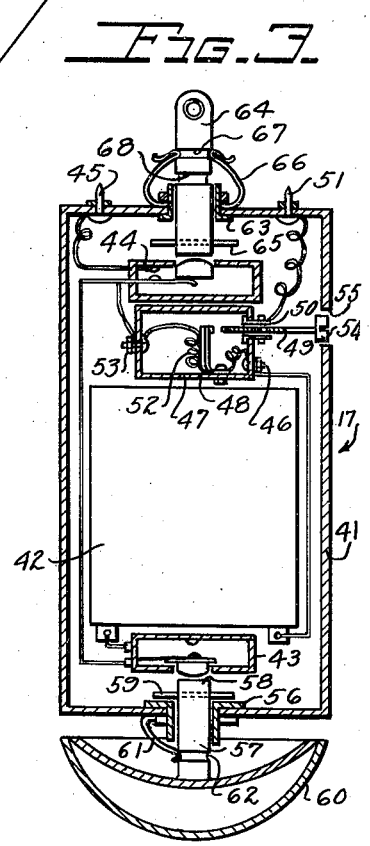
INVENTOR.
MARK HATTAN
BY Wade Koontz
ATTORNEY AND
H. H. Losch
AGENT Nov. 1, 1949.  M. HATTAN  2,486,403
PRESSURE INFLATED PARACHUTE LOAD ARRESTING DEVICE
Filed April 3, 1947  2 Sheets-Sheet 2

INVENTOR.
MARK HATTAN
BY Wade Kroontz
ATTORNEY
AND
H. H. Losch
AGENT

Patented Nov. 1, 1949

2,486,403

UNITED STATES PATENT OFFICE 2,486,403

PRESSURE INFLATED PARACHUTE LOAD ARRESTING DEVICE

Mark Hattan, Dayton, Ohio

Application April 3, 1947, Serial No. 739,085

9 Claims. (Cl. 244—152)

(Granted under the act of March 3, 1883, as amended April 30, 1928; 370 O. G. 757)

The invention described herein may be manufactured and used by or for the Government for governmental purposes without payment to me of any royalty thereon.

This invention relates to parachute load arresting devices wherein a controllable parachute canopy pressure inflating means is suspended under the canopy of the parachute to arrest movement of the parachute under loaded conditions to eliminate shock of the load landing at high speed, or to increase the drag of the parachute for aircraft braking purposes.

Various means have been devised to arrest or retard the descent of a loaded parachute in order to lessen the impact of the load with the earth. Such arresting or retarding means have been employed to retard descent by releasing an extra parachute, or parachutes, a sufficient distance above the earth to permit a safe landing speed of the load. Another known arresting means utilize an explosive charge to shorten the parachute-to-load distance an instant prior to the load striking the earth greatly reducing the downward velocity of the load momentarily to minimize the landing impact. These and other known parachute arresting or retarding devices require a considerable amount of equipment increasing the gross load of the parachute which is objectionable. While certain of these arresting devices have been satisfactory for dropping light loads they are limited in the loads dropped upwardly of one ton because of the enormous parachute sizes necessary for the load and the arresting equipment.

The present invention provides a means of arresting the movement of a parachute pulled by some force or load at a desirable instant by pressure inflating the parachute canopy. The pressure inflation can be controlled to provide the desirable arresting action. It is preferable to use an explosive means arranged in the canopy of the loaded parachute to effect the increase in pressure since the size, number, and burning rate of the explosive charge, or charges, can be adjusted to meet the arresting action required. However, a releasably controlled container of compressed gas, as $CO_2$, may be used to obtain the desirable pressure inflation necessary. The equipment for pressure inflating the canopy of a parachute is so light and compact as to offer no practical problem of weight or position, as will be realized from the more detailed description. By the use of this invention smaller parachutes may be used per load weight than were formerly used, making it possible to drop much greater loads than have ever been dropped heretofore. Further, the arresting action can be easily controlled to take place at any desirable instant providing maximum efficiency of the arresting effect.

It is a primary object of this invention to arrest or retard movement of a loaded parachute by artificially producing an expanding atmosphere under the parachute canopy.

It is another object of this invention to provide a device for producing an expanding atmosphere under the canopy of a loaded parachute at a predetermined distance above the earth for decelerating the parachute in its descent to prevent the load from landing at high speed.

It is a further object of this invention to provide a parachute load arresting device for producing a sequence of explosions under the parachute canopy to retard the parachute movement in steps.

It is still a further object of this invention to provide a parachute load arresting device in which one or more explosive means are adapted to be suspended under the canopy of a loaded parachute having electrical detonating means electrically connected through a safety switch therein to a ground switch that is adapted to be suspended a predetermined distance below the parachute load, the ground switch including a safety switch and a control switch in series with the first mentioned safety switch and detonating means arranged to create an increase of pressure under the parachute canopy by the explosive means upon the ground switch striking some object to decelerate the loaded parachute in its descent.

These and other objects and advantages will become apparent without departing from the spirit and scope of this invention as the description proceeds and taken in conjunction with the accompanying drawings, in which:

Fig. 1 shows a loaded parachute as it would appear in earthward descent with the ground switch and charge of the arresting device in position, a part of the parachute canopy being cut away to show the charge suspension;

Fig. 2 is a cross-sectional view of the explosive charge and the related safety switch used in this invention;

Fig. 3 is a cross-sectional view of one form of ground switch including related time delay and safety switches;

Figure 5:
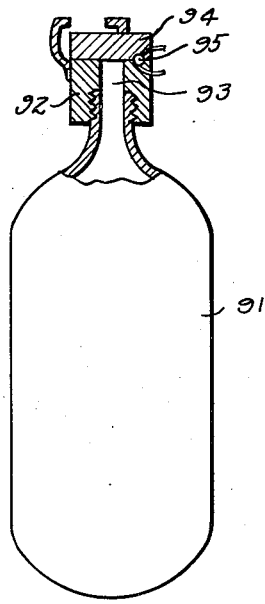
Fig. 5 shows a gas cylinder, partly in section, with an explosive releasable outlet.
Figure 7:
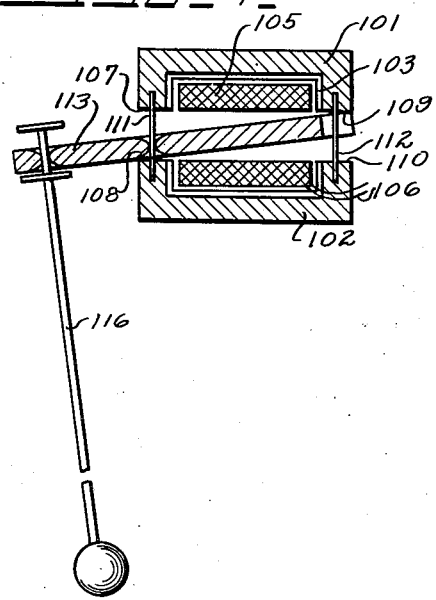
Fig. 7 is a cross-sectional view of the electrical pulse generator ground switch taken on the line 7—7 of Fig. 6.
Figure 6:
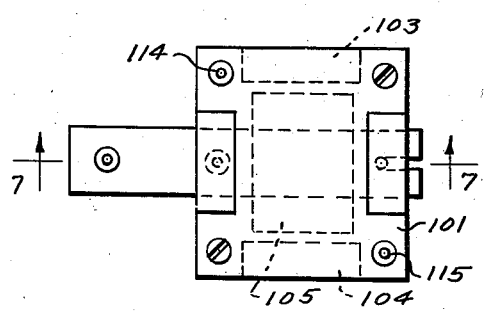
Fig. 6 is a top view of an electrical pulse generator ground switch with parts shown in broken lines.

Referring particularly to Fig. 1 there is shown a parachute having a canopy 11 to which are fastened the usual shroud lines 12 which converge at their lower ends to a common ring 13, or the like, as the parachute form taken in actual earthward descent. A load represented by 14 is strapped or otherwise fastened to the ring 13 by the fastening means 15. Suspended below the load 14 as by means of a cable 16 is a ground switch 17, shown in this figure as the ground switch illustrated in Figs. 3 and 4 but which may be represented by a ground switch as illustrated in Figs. 6 and 7. The ground switch 17 is electrically connected by an electrical cable conductor 18 to a charge 19 illustrated as the form shown in Fig. 2 although a charge as shown in Fig. 5 may be used. The charge 19 is suspended in the dome of the parachute preferably by a cord or rope 20 attached to the apex of the parachute canopy 11. The charge 19 may be suspended at any desirable distance from the canopy apex but it has been found that the best results are obtained when the charge is suspended in the approximate plane of the parachute canopy perimeter.

It is preferable to house the ground switch 17 in an inverted container 17', shown in cross-section, which is fastened to the load 14 in some well known manner as by strapping. A light shear pin 17'' sufficiently retains the ground switch in the position shown in dotted lines but is of insufficient strength to retain the ground switch 17 therein against the opening shock of the parachute. The ground switch 17 fits within the inverted container 17' with a close tolerance, as for example .002 of an inch, such that the ground switch is held by vacuum in the container for a few seconds after the initial opening shock of the parachute thus avoiding any necessity of a large heavy cable at 16 to withstand what otherwise would amount to a whipping action of the ground switch. Where desirable a portion of the electric cable 18 may be used for suspending the ground switch 17. Another heavy pin 17''' may be used to hold the ground switch in place in the container 17' during handling but must be removed in preparation of dropping the loaded parachute into the atmosphere.

In Fig. 2 is shown the preferred form of charge 19 which consists of a cup-shaped container 21 of light weight material, as pressed paper that is water repellent. A short distance below the top perimeter 22 of the container 21 is a closure wall 23 having a central well 24 that is constructed preferably of the same material as container 21. A short distance above closure wall 23 is a strip of electrical insulating material 25 as fiber, or the like, that is sufficiently rigid to support two electrical spring contact members 26 and 27 that are adapted normally to contact each other. The strip 25 may be fastened at diametrically opposite points to the container wall 21 in any desirable manner as by riveting or cementing. The strip 25 has a central opening 28 for the purpose later to be described. Fastened at diametrical opposite points to the top perimeter 22 of the container 21 as by rivets 29 is a leather strap 30 that is sufficiently long to span the diameter of the container 21 after being doubled back on itself at 31. A spring ring 32 may be employed to impositively retain the leather strap in the position shown by snapping it on the inner top perimeter portion 22 of the container 21 against the doubled back portions 31 of the strap 30. The leather strap 30 has a central opening 33 to permit the rope 20 to pass therethrough and tie to a pin 34 of electrical insulating material. The pin 34 extends downward through the opening 28 and into the well 24 to hold spring contacts 26 and 27 electrically separated. The head of the pin 34, or the knot of the rope 20, is of such size that it can not pass through the opening 33. In the bottom of the well 24 is a detonator fuse 35 having one lead 36 connected to the spring contact 26 and the other lead 37 connected to a terminal post 38 on the container 21. The spring contact 27 is connected to a terminal post 39 also on container 21. It may be seen from this figure that current can not pass through the detonator fuse 35 until the pin 34 is pulled out by the rope 20. It is preferable, but not necessary, that the rope 20 be fastened to the ring 32 prior to passing through the opening 33 to be fastened to the pin 34.

Referring now to Fig. 3 there is shown a case 41 of electrical insulating material that houses a small dry cell battery 42 having one terminal post connected to one terminal of a normally open switch 43 located near the bottom of the case 41. The other terminal of the switch 43 is connected to one terminal of a normally closed switch 44 located in the top of the case 41. The other terminal of the normally closed switch 44 is connected to a terminal post 45 on the case 41. The other terminal of the battery 42 is connected to a terminal 46 of a time delay switch 47. The terminal 46 is electrically connected to a super sensitive bi-metallic contact member 48 that is in operative contact relation with an adjustable screw 49 that is screw threaded in a bushing 50 attached to the case of the time delay switch 47. The bushing 50 serves as a terminal post which is electrically connected to a terminal post 51 on the case 41. A heater coil 52 is arranged adjacent the bi-metallic member 48 having one lead connected to the terminal 46 and the other lead connected to the first mentioned terminal of the normally closed switch 44 through a time delay switch terminal post 53. The adjustable screw 49 has a slotted screw head 54 that is adapted to be adjusted through an opening 55 in the case 41 for controlling the separation between the contact end of the screw 49 and the contact end of the bi-metallic member 48. The adjustable screw head 54 and the case 41 at the periphery of the opening 55 may be marked with reference indicia, if so desired, to denote the time lag operation of the time delay switch.

The bottom wall of the case 41 has a bushing 56 in an opening therein through which a pin 57 is adapted to slide. Upon inward movement of the pin 57 the end 58 thereof actuates the normally open switch 43 to close the circuit through this switch. A cross pin 59 is positioned through the upper end of the pin 57 to prevent separation of pin 57 from the case 41. The lower end of the pin 57 is secured to a substantially semispherical container 60 that is crescent-shaped in cross section. A light leaf spring 61 held at one end by the bushing 56 engages a groove 62 in the pin 57 to retain this pin just out of engagement with a normally open switch actuator to avoid inadvertent circuit establishment but of insufficient strength to retain the pin 57 upon the descent of the ground switch 17 to bring the hemi-spherical member 60 into engagement with some solid or liquid. It may be noted that the normally open switch 43 will be actuated by the pin 57 although the ground switch may strike an object at a considerable angle.

The upper wall of case 41 has a similar bushing 63, pin 64, and cross pin 65 the lower end of the pin 64 of which is adapted to engage the normally closed switch 44 actuator to break the circuit thereof. Two leaf springs 66 held at one end by the bushing 63 engage a groove 67 to impositively hold the pin 64 with the end in engagement with the normally closed switch 44 actuator to maintain the circuit broken in this switch. A shoulder 68 is formed on the pin 64 such that an upward jerk or pull on the pin 64 will permit the springs 66 to snap under the shoulder 68 to hold the pin 64 out of engagement with the normally closed switch 44 actuator. Subsequent downward movement of the pin 64 requires manual disengagement of the springs 66 from the shoulder 68.

In operation the charge 19 is attached to the apex of the parachute canopy by the rope 20 and the ground switch attached to the load 14 by the cable 16 as formerly described. A two-wire cable 18 connects the terminal posts 45 and 51 to the terminal posts 38 and 39. The charge 19 and the ground switch 17 are set as shown in Figs. 2 and 3, respectively, prior to the parachute being dropped into the atmosphere. Upon the loaded parachute being dropped into the atmosphere the canopy 11 will open in the usual manner and the weight of the charge 19 on the rope 20 will pull the circular snap ring 32 out of the end of the container 21 releasing the leather strap 30. The pin 34, or rope knot, is pulled upwardly against the leather strap which holds the charge suspended. The upward movement of the pin 34 allows the contacts 26 and 27 to make electrical contact.

The opening shock of the parachute causes the ground switch 17 to shear the pin 17" allowing the ground switch after a very short interval of time to drop from the container 17'. The drop of the ground switch 17 causes a jerk on the pin 64 to move it upward until the cross pin 65 engages the bushing 63 whereupon the leaf springs 66 snap under the shoulder 68. The upward movement of the pin 64 permits the switchh 44 to assume its normally closed position. Upon the ground switch striking the earth the pin 57 is pushed inwardly to close the normally open switch 43 which immediately energizes the heater coil 52 to heat the bi-metallic member 48 causing it to bend to the right and make contact with the adjustable screw 49. This completes a circuit to the detonator fuse 35, the switch 44 and the safety switch 27 being closed, to explode the charge 19. The explosion of the charge produces an increase in pressure upwardly against the canopy of the parachute to arrest or greatly retard downward movement of the loaded parachute just prior to the landing of the load.

Figure 4:
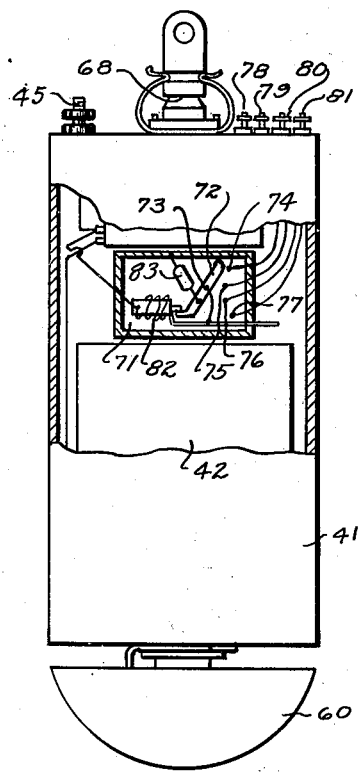
Fig. 4 shows the ground switch in which a sequentially operated multiple switch is substituted for the time delay switch.

By changing the distance between the load 14 and the ground switch 17, or by using a maximum rope (16) length and properly adjusting the time delay switch 47, the load can be stopped at any desirable distance above or at the land or water to the extent of the ground switch distance from the load. Where it is desirable to retard the loaded parachute in steps a number of charges of suitable power may be suspended and detonated in sequence. For this purpose, as shown in Fig. 4, the time delay switch 47 may be replaced by a sequentially operated switch 71 in which a contact arm 72 is pivoted at 73 to permit one end to pass over contacts 74, 75, 76, and 77 that are connected to terminal posts 78, 79, 80, and 81, respectively. The opposite end of the arm 72 has a latch portion adapted to be engaged by the armature of an electromagnet 82 to retain the arm in a position off of the contacts 74—77. A spring enclosed in a dash pot 83 holds the arm latch against the armature and upon withdrawal of the armature from the latch portion the arm 72 will pivot about 73 over contacts 74—77 at a speed determined by the leak of the dash pot 83. The coil of the electromagnetic 82 is connected to the terminals of the battery 42 through the switches 43 and 44. The terminal post 45 is connected to one terminal of four charges 19 while each of the terminals 78—81 is connected to the other terminal of each of the four corresponding charges 19. Upon the parachute having descending motion as illustrated in Fig. 1 and with the pin 64 extended upward such that the springs 66 are under the shoulder 68, the striking of the member 60 on some object will connect the battery 42 to the electromagnet 82 to cause the release of the lever 72 which will move over the contacts 74—77 to detonate the four charges sequentially thus causing a series of blasts to retard the descending movement of the loaded parachute in steps. Showing a sequentially operated switch for use with four charges is merely for the purpose of illustration since any convenient number of contacts may be constructed in the switch, as desirable.

The charge 19 may take the form of a small container, or containers, of gas under pressure as shown in Fig. 5 in which a container 91 has a cap 92 having a central opening 93 screw threaded thereon. The cap 92 has a disk 94 fastened to the cap 92 as by a thin layer of solder. In complementary cavities of the cap 92 and disk 94 is a small explosive 95 adapted to rip the disk 94 from the cap 92 permitting the disk 94 to rest against the cap lugs and divert the released gas radially outward to eliminate container recoil upon the explosive 95 being detonated by an electric current. The released gas will quickly increase the pressure under the canopy of the parachute retarding the movement of the parachute and its load.

The battery carrying ground switch 17 may be substituted by a voltage pulse generating means as shown in Figs. 6 and 7. This voltage pulse generator consists of two end plates 101, 102 of ferro-magnetic material that clamp permanent magnets 103 and 104 at their opposite ends. A coil 105 is placed within the enclosure formed by the end plates and the permanent magnets and has two coil leads 106 extending to the exterior. Central portions of the two plates 101 and 102 are turned inwardly to form pole ends 107, 108, 109, and 110 which are drilled to receive small pins 111 and 112. The small pins 111 and 112 retain a bar 113 of ferromagnetic material that is adapted to cooperate with the pole ends, the central portion of which extends through the coil 105. One end of the bar 113 extends outwardly as a lever arm whereupon an upward push (as viewed in Fig. 7) thereon will snap the bar 113 to pole ends 107 and 110 while at the same time producing a voltage pulse in the coil 105 due to changed flux relation through the bar 113. Likewise a downward pull on the bar 113 will shift it to the pole ends 108, 109 and produce a voltage pulse in the coil 105. The plates 101, 102 have openings 114 and 115 which may be used to fasten this voltage pulse generating means to the bottom surface of the parachute load 14 or to weight suspended below the load 14, as desirable. The bar 113 has a rod 116 for contacting the earth to snap the bar 113 from one of its positions to the other it being understood that the bar 113 should be correctly positioned as viewed in Fig. 7 before releasing the loaded parachute in order to snap the bar 113 in the upward direction. The leads 106 should be connected to the charge 19 in the same manner as the ground switch 17. The operation of the loaded parachute using the pulse generating means is believed to be apparent and will not be described further.

It has been found in practicing the above invention that a one half pound nitrostarch charge suspended under the canopy of a 28-foot parachute in the manner described will produce, when discharged, approximately a 2500 pound thrust on the parachute shroud lines. This thrust may be increased by increasing the charge. It may become necessary to increase the size of the shroud lines and the strength of the parachute canopy when obtaining thrusts of high order.

While this load arresting device is particularly illustrated for use in dropping a load to earth it may be well understood that a parachute with a similar charge, or charges, may be used behind aircraft, or the like, and a control switch operated by an occupant of the aircraft to discharge the charge, or charges, to decelerate the aircraft. It is to be understood that the use of the term "load" in connection with the parachute may refer to a mass suspended by a freely falling inflated parachute or to an aircraft or other device that pulls the inflated parachute through the atmosphere. Therefore, the embodiments of the invention herein shown and described are to be regarded as illustrations only and it is to be understood that the invention is susceptible to variations, modifications, and changes within the spirit and scope of the appended claims.

I claim:

1. Means for arresting the movement of an inflated parachute being dragged through the atmosphere by a load comprising; a releasable pressure inflation producing means suspended in the atmosphere under the parachute canopy for creating a temporary increase in atmospheric pressure under the inflated canopy to increase the parachute buoyancy; electrical means under said parachute canopy and in operative association with said inflation producing means for releasing said inflation producing means upon activation of the electrical means; and remotely controllable electrical actuatable means electrically connected to said electrical means for activating said electrical means upon actuation of said actuatable means to release said pressure inflation producing means and produce deceleration of the inflated parachute with its load.

2. Means for arresting the movement of an inflated parachute as set forth in claim 1 wherein said releasable pressure inflation producing means is explosive means and said electrical means is an electric detonator.

3. Means for arresting the movement of an inflated parachute as set forth in claim 1 wherein said releasable pressure inflation producing means is a container means of compressed gas and said electrical means is an electrically controlled closure in said container.

4. A method of arresting the descent of an inflated parachute and load suspended thereby just prior to impact of the load with the earth which comprises detonating explosive means within the parachute canopy a predetermined distance of the load above the earth.

5. A loaded parachute arresting device for halting the descent of a loaded parachute comprising an explosive charge suspended under the parachute canopy and adapted to be detonated electrically for producing a temporary increase in pressure against the underside of said parachute canopy, a normally open ground switch suspended a predetermined distance under said parachute load adapted to be closed upon contacting the earth and being in electrical circuit with a voltage supply source and said explosive charge to discharge said explosive charge whereby said loaded parachute is arrested in its earthward movement a predetermined distance of the load above the earth.

6. A loaded parachute arresting device for halting the descent of a loaded parachute in the atmosphere comprising an explosive charge suspended under the parachute canopy and adapted to be detonated electrically for producing an expanding atmosphere upwardly against the parachute canopy to increase the inflation pressure thereof; a normally open ground switch suspended a predetermined distance below the parachute load and adapted to be actuated to closed position upon contacting the earth; a time delay switch; and a voltage supply source in a circuit with said explosive charge, said ground switch, and said time delay switch whereby said charge is exploded a predetermined interval of time after the closing of said ground switch in accordance with the time lag of said time delay switch.

7. A loaded parachute arresting device for stopping the descent of a loaded parachute in the atmosphere comprising a parachute canopy pressure inflation producing means suspended under the parachute canopy and adapted to be activated electrically for producing a temporary increase in inflation pressure within said parachute canopy; an electrical voltage supply source having a switching mechanism associated in a predetermined relation under the parachute load such that the switching mechanism is adapted to be actuated by a descending contact with an object; an electrical circuit serially connecting said pressure inflation producing means and said voltage supply source; and safety switch means in said circuit that retains the circuit broken until after said loaded parachute has maintained its buoyancy in the atmosphere whereby actuation of said switching mechanism will cause activation of said pressure inflation producing means to produce arresting effects on the loaded parachute.

8. A parachute load arresting device for halting the descent of a loaded parachute in the atmosphere in steps comprising a multiple of explosive charges suspended under the parachute canopy and adapted to be detonated electrically for producing a temporary increase in inflation pressure under said parachute canopy; a normally open cylindrically shaped ground switch impositively held within an inverted cylindrical cup-shaped container by a frangible pin that is adapted to break upon the opening shock of said parachute canopy permitting said ground switch to be suspended a predetermined distance below said parachute load, the movement of said ground switch out of said cup-shaped container being retarded by vacuum, and said ground switch being actuatable to closed position upon descending contact with the earth; a sequentially operated multiple switch adapted to operate at a predetermined speed; a voltage supply source in a circuit including safety switches connecting said explosive charges, said ground switch, and said sequentially operated multiple switch, said safety switches retaining said circuit broken until said parachute has maintained its buoyant condition in the atmosphere whereby the actuation of said ground switch will cause sequential detonation of said explosive charges to decelerate the descent of said loaded parachute in steps.

9. A loaded parachute arresting device for stopping the descent of a loaded parachute in the atmosphere comprising, a parachute canopy pressure inflation producing means suspended under the parachute canopy and adapted to be activated electrically for producing a temporary increase in inflation pressure within said parachute canopy, a cylindrically shaped ground switch impositively held within an inverted cylindrical cup-shaped parachute load held container by a frangible pin that is adapted to break upon the opening shock of said parachute canopy permitting said ground switch to be suspended by a suspension means a predetermined distance below the parachute load, the movement of said ground switch out of said cup-shaped container being retarded by vacuum, said ground switch enclosing a voltage supply source, a normallly open switch, and a normally closed safety switch, the safety switch having a detented actuator pin extending from one end of said ground switch and connected to the load by said suspension means and adapted upon said ground switch being suspended by its own weight to move said detented actuator pin to permit said safety switch to close, and said normally open switch having an actuator means extending to the exterior from the other end of said ground switch and adapted to be closed upon said actuator means of said normally open switch engaging an object, the voltage supply source, safety switch, and normally open switch being in serial electrical connection with said pressure inflation producing means whereby the activation of the pressure inflation producing means is under the control of said ground switch.

MARK HATTAN.

REFERENCES CITED

The following references are of record in the file of this patent:

UNITED STATES PATENTS

| Number | Name | Date |
|---|---|---|
| 1,709,264 | Holt | Apr. 16, 1929 |
| 1,840,618 | Castner | Jan. 12, 1932 |
| 2,253,586 | Serkau | Aug. 26, 1941 |
| 2,414,284 | Bacon | Jan. 14, 1947 |

FOREIGN PATENTS

| Number | Country | Date |
|---|---|---|
| 474,171 | France | Nov. 6, 1914 |